(12) United States Patent
Bonanti

(10) Patent No.: US 6,976,929 B1
(45) Date of Patent: Dec. 20, 2005

(54) RETAINER SLEEVE FOR TRANSMISSION GEAR AXLE

(76) Inventor: William J. Bonanti, 6860 W. Ridge Rd., Fairview, PA (US) 16415

( * ) Notice: Subject to any disclaimer, the term of this patent is extended or adjusted under 35 U.S.C. 154(b) by 0 days.

(21) Appl. No.: 10/718,732

(22) Filed: Nov. 21, 2003

(51) Int. Cl.⁷ .............................................. F16H 48/06
(52) U.S. Cl. ................................................ 475/230
(58) Field of Search .............................. 475/220, 230, 475/248

(56) References Cited

U.S. PATENT DOCUMENTS

| | | | |
|---|---|---|---|
| 1,332,535 A * | 3/1920 | Baker .......................... | 475/230 |
| 4,363,248 A * | 12/1982 | Brisabois ..................... | 475/230 |
| 4,402,238 A * | 9/1983 | Craig .......................... | 475/230 |
| 4,541,306 A * | 9/1985 | Hokusho et al. ............. | 475/230 |
| 4,722,244 A * | 2/1988 | Tsuchiya et al. ............ | 475/230 |
| 4,796,488 A * | 1/1989 | Hagin et al. ................ | 475/230 |
| 5,951,431 A * | 9/1999 | Downs et al. .............. | 475/230 |
| 6,254,505 B1 * | 7/2001 | Forrest ....................... | 475/230 |

FOREIGN PATENT DOCUMENTS

| | | | | |
|---|---|---|---|---|
| JP | 62-246646 | * | 10/1987 | ................. 475/230 |
| JP | 5-280594 | * | 10/1993 | ................. 475/230 |

* cited by examiner

*Primary Examiner*—Ha Ho
(74) *Attorney, Agent, or Firm*—Richard K Thomson

(57) ABSTRACT

A retainer sleeve surrounds a differential carrier in line with an axle for the two laterally positioned spider gears preventing the axle from slipping out of its mounting in the differential carrier and tearing a hole in the transmission housing. The sleeve is an annulus that has a pair of legs extending from one edge thereof, each leg have a foot with a hole there through which overlies one of the bores in the flange of the differential carrier by which it is attached to the ring of the ring and pinion gear.

2 Claims, 5 Drawing Sheets

RETAINER SLEEVE FOR TRANSMISSION GEAR AXLE

BACKGROUND AND SUMMARY OF THE INVENTION

The present invention is directed to vehicle transmissions. More particularly, the present invention is directed to a retainer sleeve which surrounds a differential carrier inside the transmission housing which keeps the axle for two of the spider gears from blowing a hole in the housing should the retention pin break, or otherwise become disengaged, from the axle.

A number of transmissions suffer from a common problem. An axle for a pair of spider gears is retained in place in the differential carrier by a fragile pin. This pin frequently breaks or otherwise becomes disengaged allowing the axle to axially slide out of its housed position in the differential carrier. This often happens when the differential carrier is turning at speeds upwards of 5000 rpm. This will launch this axle at high velocity, impacting the transmission housing and knocking a hole in the wall of this cast aluminum part. This greatly exacerbates the damage caused by the axle being let loose and multiplies the expense to the vehicle's owner. This missile and the shrapnel it creates can do additional damage to the vehicle, as well as pose a safety threat to the passengers of the car or truck.

While a number of transmissions have this problem, the particular transmission for which the retainer ring of the present invention has been designed is the 604 trans-axle, a transmission used on most all Chrysler minivans since 1988. In a transmission housing in which a fragile pin serves as retention means for an axle for one or more spider gears in a differential carrier, the present invention comprises a sleeve which encircles the differential carrier at a point in which the axle is mounted for rotation in the differential carrier; means to attach said sleeve to a ring of a ring and pinion of the differential carrier; whereby when the fragile pin breaks, said sleeve retains the axle within the differential carrier preventing the axle from damaging the transmission housing.

The sleeve preferably comprises an annulus, or ring, which has a width at least as great as the diameter of the axle. This sleeve has a pair of legs extending from opposed edge portions of the annulus and each of the legs has a laterally extending foot. Each foot has a hole there through which overlies a bore in the ring of the differential carrier. When the bolts are inserted through the bores in the ring, the retaining sleeve is secured in position to prevent the axle from being launched into the side of the transmission housing when the retention pin breaks or is otherwise disengaged.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
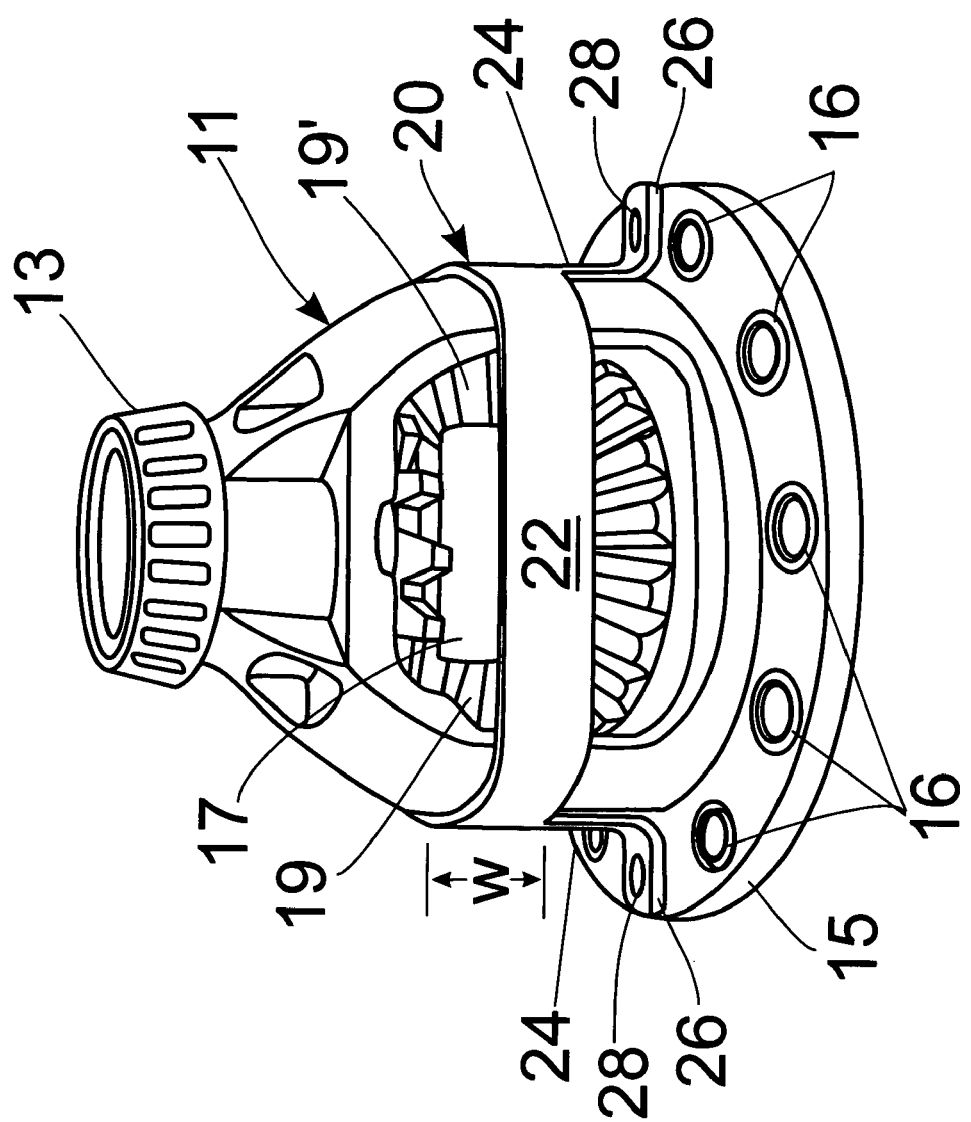
FIG. 1 is a view of a first embodiment of the retainer sleeve of the present invention shown mounted on the differential carrier.
Figure 2A:
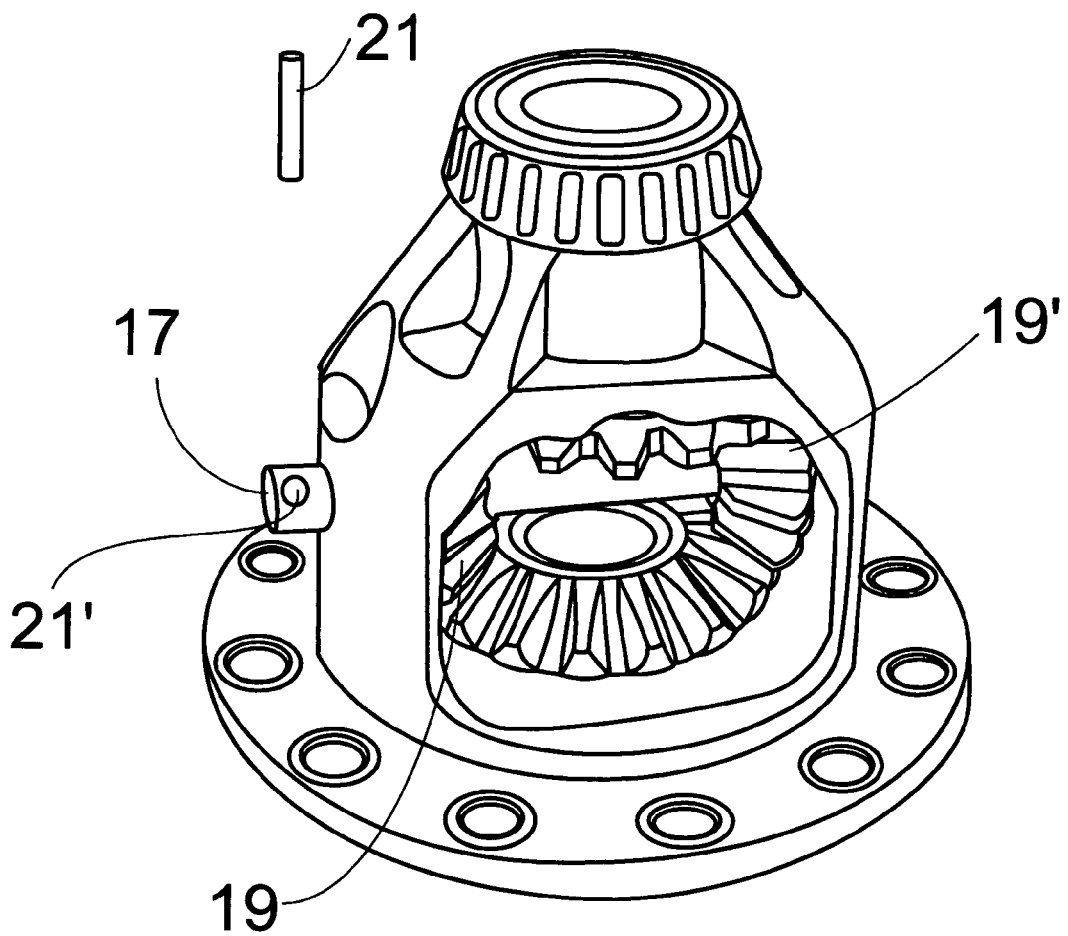
FIG. 2A is a perspective view of the prior art differential carrier with the retainer sleeve removed to show additional details.
Figure 2B:
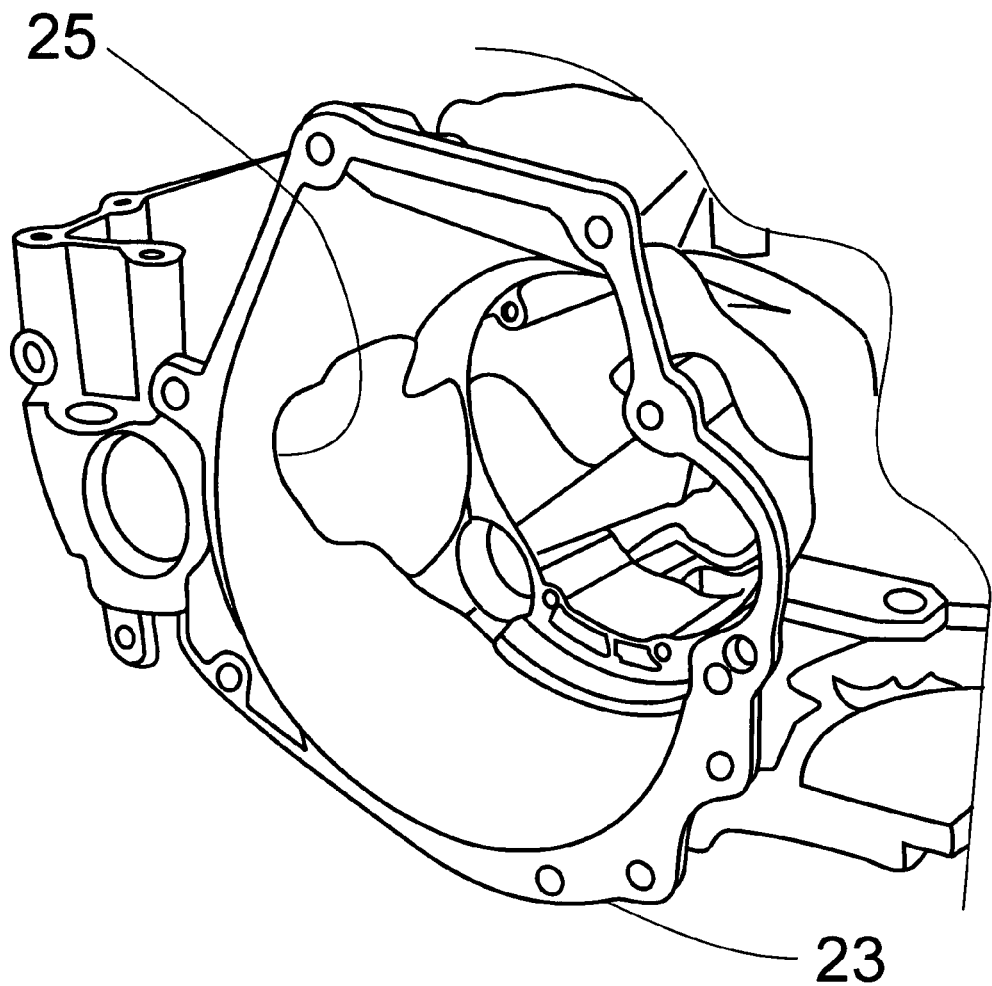
FIG. 2B is a perspective view of the prior art transmission housing showing the damage done to the housing when the retention pin breaks.
Figure 3:
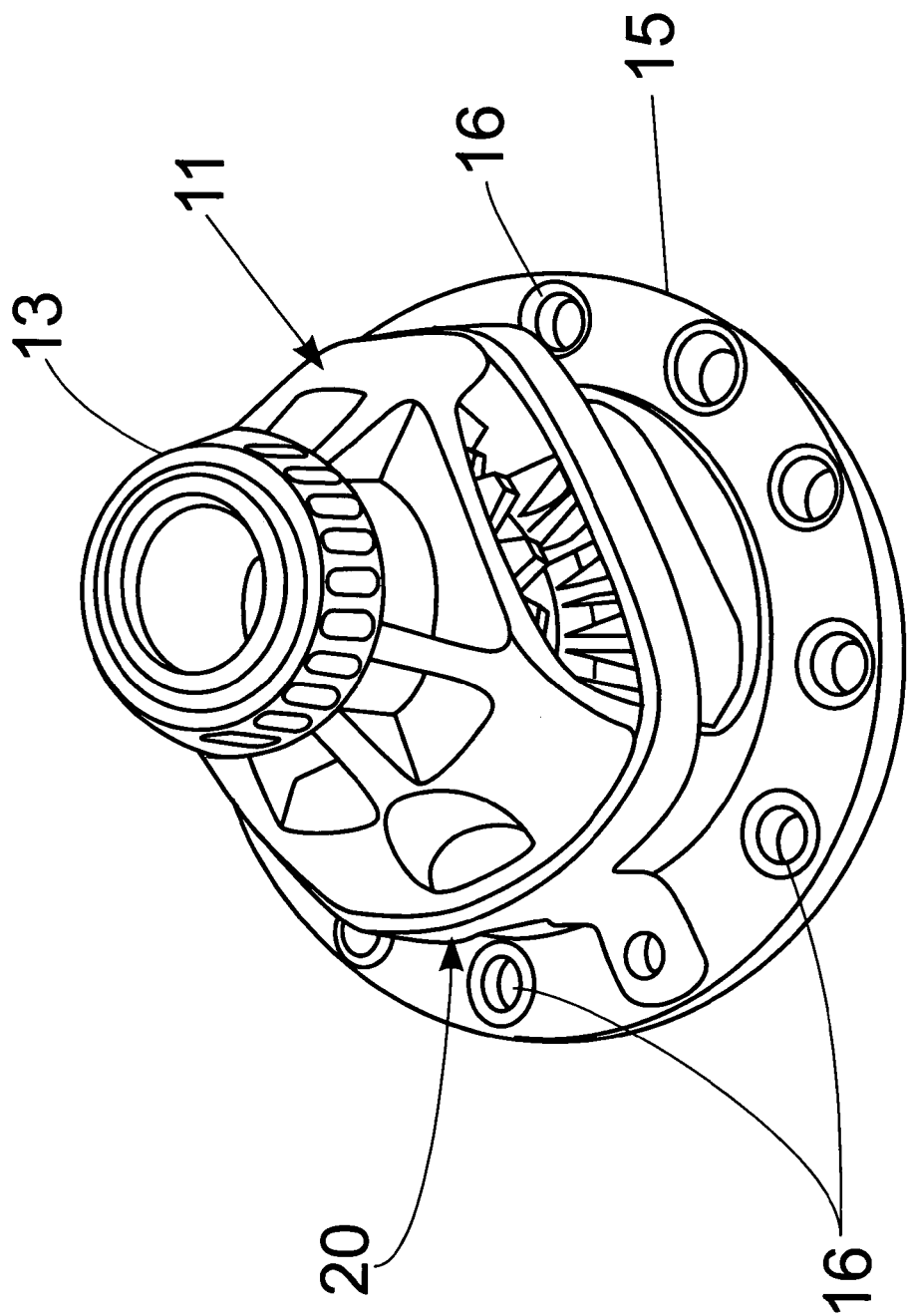
FIG. 3 is a perspective view of the retainer sleeve mounted on the differential carrier.
Figure 4:
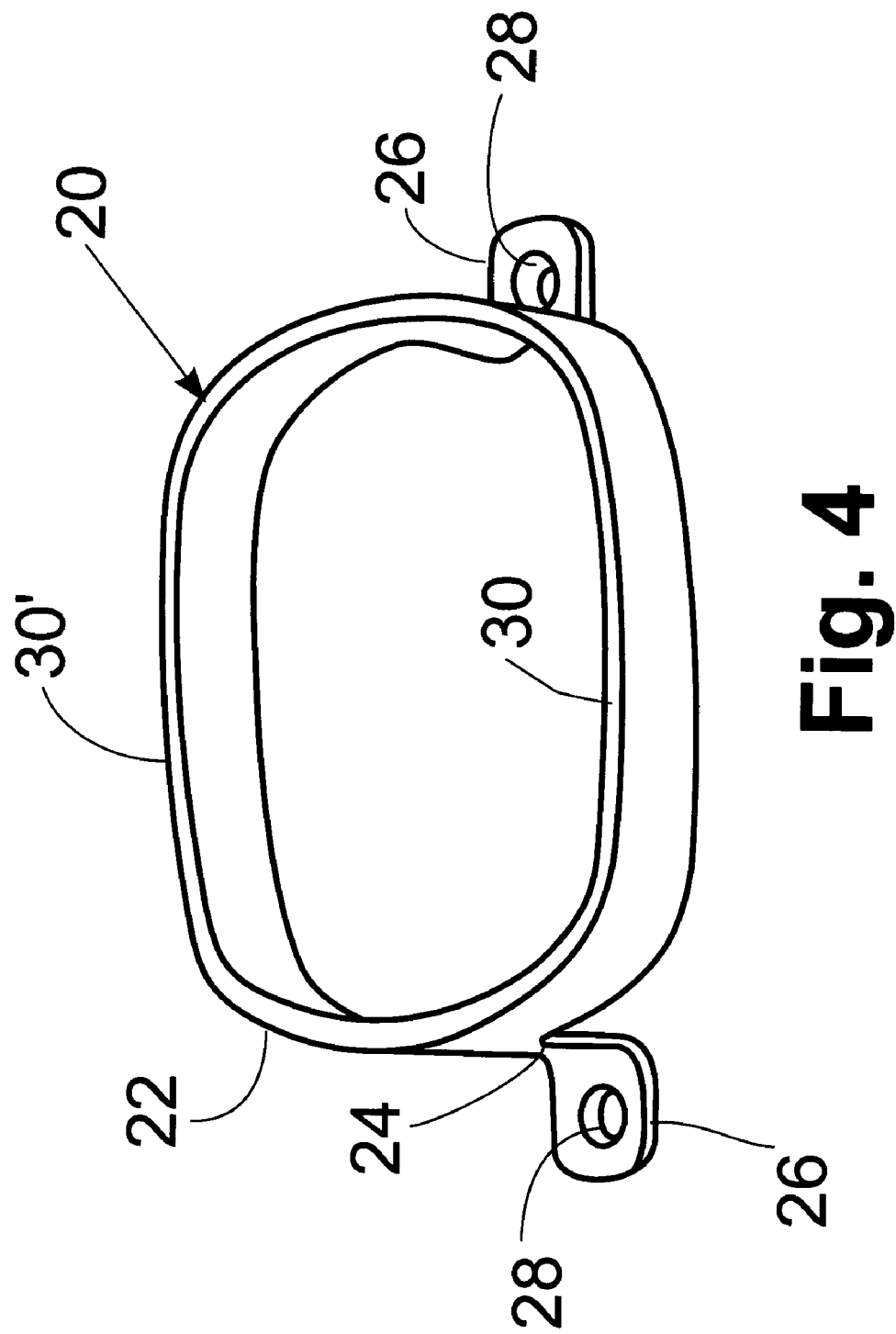
FIG. 4 is a perspective view of the retainer sleeve off of the differential carrier.

The retainer sleeve of the present invention is shown in FIGS. 1, 3, 4 generally at 20. As best seen in FIG. 2A, the differential carrier 11 has a bearing 13 on its upper end and a laterally extending flange 15 on its lower end with bores 16 there through by which it is bolted to the ring of a ring and pinion gear (not shown). Axle 17 mounts two spider gears 19, 19' and is retained in place by pin 21 press fit in hole 21' (FIG. 2A). This pin 21 has a tendency to break or otherwise become disengaged as the transmission undergoes typical wear and tear. With the pin 21 missing, axle 17 becomes a missile launched at high rpm that can rip a hole in the transmission housing 23 (FIG. 2B). As seen in FIG. 2B, hole 25 in the transmission housing 23 is indicative of the type of damage that can result. Replacement of the housing 23 is the only viable option which significantly increases the cost of the repair.

The retainer sleeve comprises an annulus or ring 22 having a width 'w' at least as great as the diameter of axle 17. A pair of legs 24 protrude from opposite edge portions of the annulus 22, each with a foot 26 extending laterally over bores 16 and having a hole 28 therein generally of the same diameter as bore 16. In this way, when the bolts (not shown) are inserted into bores 16 to secure the differential carrier 11 to the ring and pinion gear, the retention sleeve 20 is held in place thereabout. As best seen in FIG. 4, the annulus is flattened along the two lateral sides 30, 30' for a tighter fit about the carrier 11. Should the pin 21 break or otherwise become disengaged from axle 17, retention sleeve 20 will prevent its exiting its mounting in the carrier 11. The small width 'w' of the annulus 22 avoids interference with the lubrication of the spider gears within carrier 11.

Various changes, alternatives and modifications will become apparent to one of ordinary skill in the art following a reading of the foregoing specification. It is intended that any such changes, alternatives and modifications as fall within the scope of the appended claims be considered part of the present invention.

I claim:

1. In a transmission housing in which a fragile pin serves as retention means for an axle for one or more spider gears in a differential carrier, the improvement comprising
   a) a sleeve which encircles the differential carrier inside the transmission housing at a point in which the axle is mounted for rotation in the differential carrier, said sleeve being formed as an annulus having a width at least as great as a diameter of the axle;
   b) means to attach said sleeve to a ring of a ring and pinion of the differential carrier including a pair of legs extending from opposed edge portions of said annulus, each of said legs having a laterally extending foot;

whereby when the fragile pin becomes disengaged with the axle, said sleeve retains the axle within the differential carrier preventing the axle from damaging the transmission housing.

2. The improvement of claim 1 wherein each said foot has a hole there through which overlies a bore in the ring of the differential carrier.

* * * * *